Oct. 28, 1924.

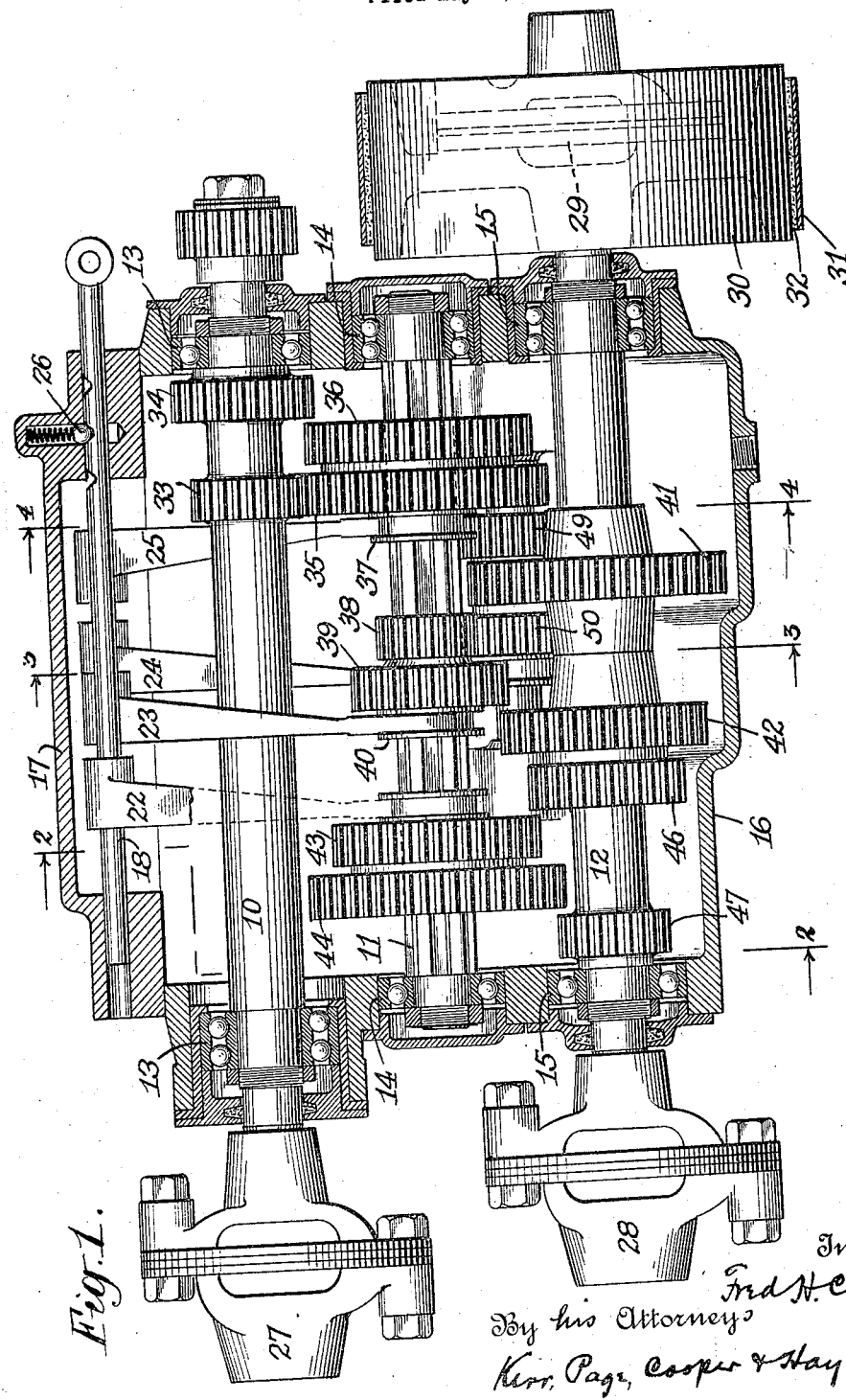

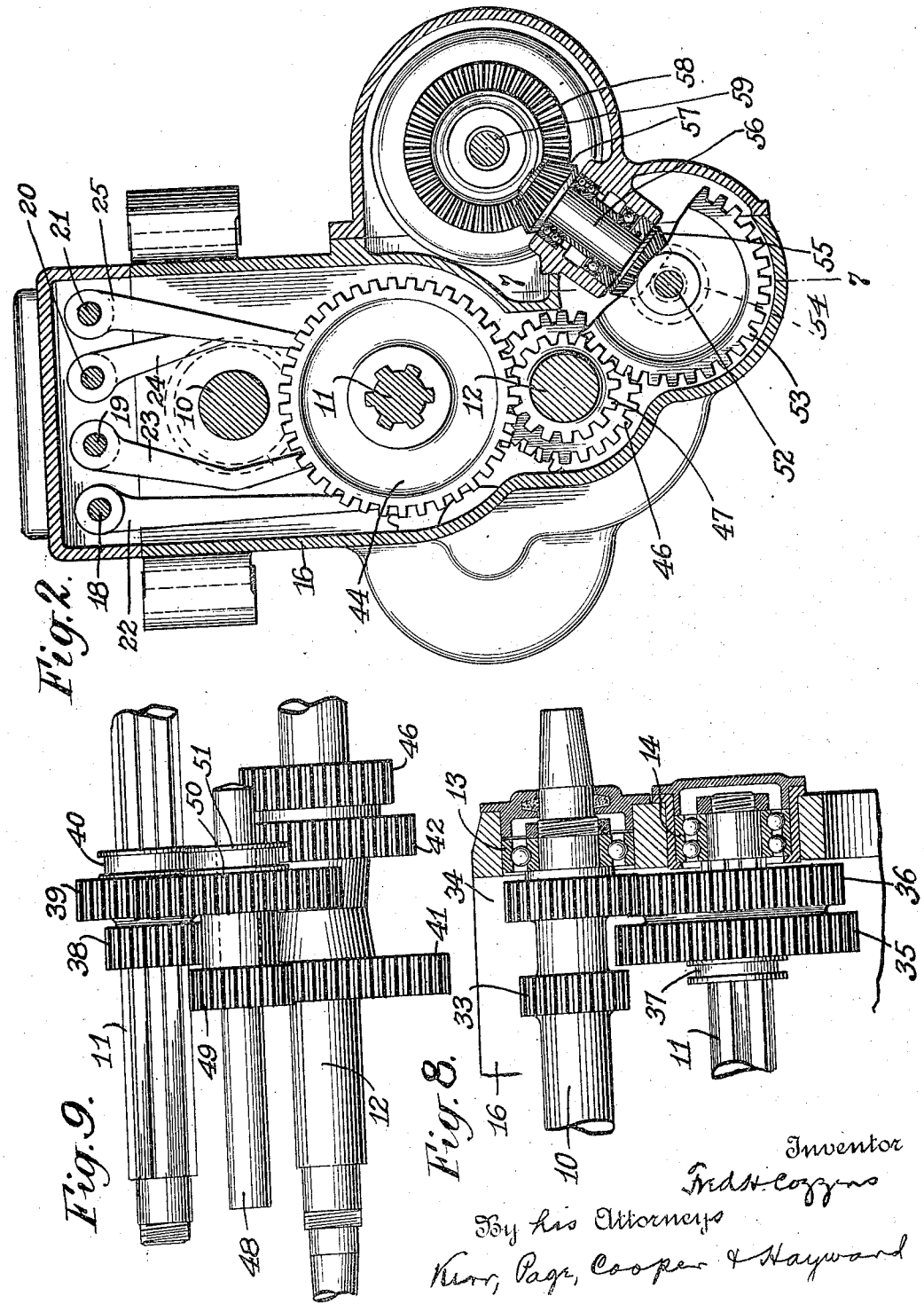

F. H. COZZENS 1,513,374

TRANSMISSION MECHANISM FOR AUTOMOTIVE VEHICLES

Filed May 5, 1920    4 Sheets-Sheet 3

Inventor
Fred H. Cozzens
By his Attorneys

Oct. 28, 1924.
F. H. COZZENS
1,513,374
TRANSMISSION MECHANISM FOR AUTOMOTIVE VEHICLES
Filed May 5, 1920  4 Sheets-Sheet 4
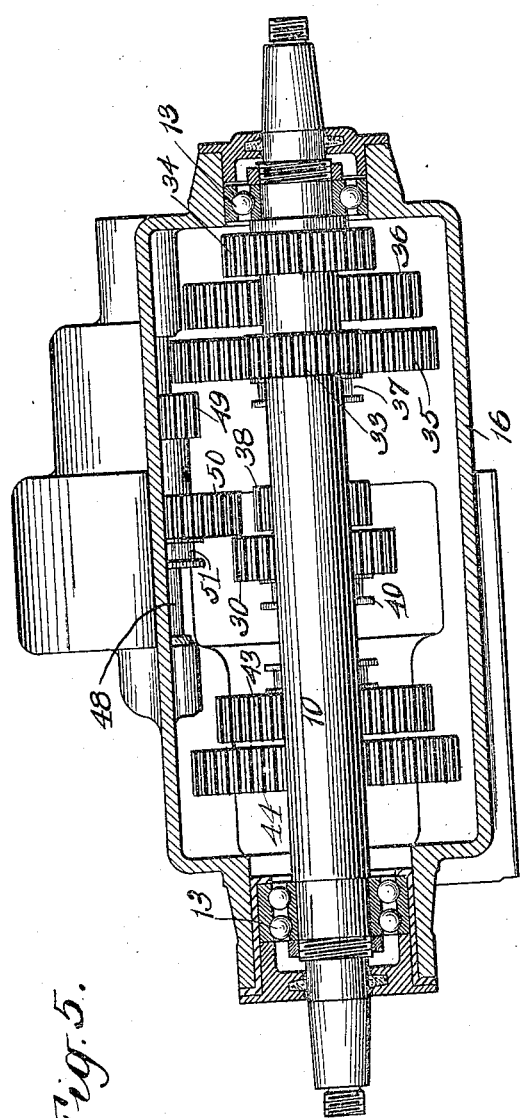
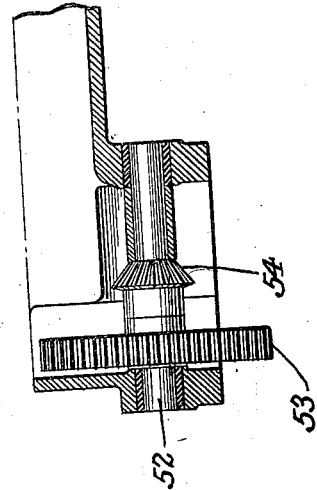
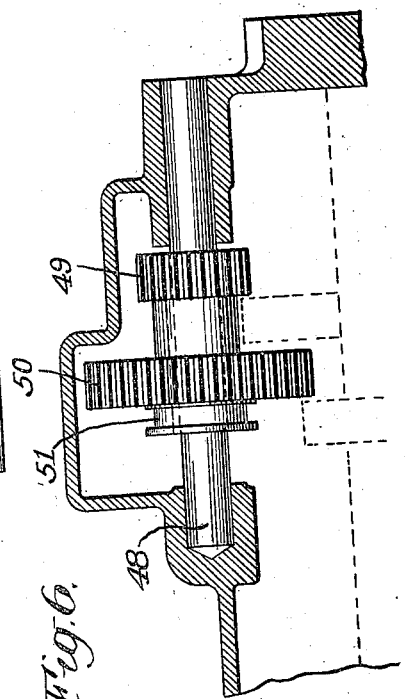
Inventor
Fred H. Cozzens
By his Attorneys
Kerr, Page, Cooper & Hayward Patented Oct. 28, 1924.

1,513,374

UNITED STATES PATENT OFFICE.

FRED H. COZZENS, OF NEW YORK, N. Y.

TRANSMISSION MECHANISM FOR AUTOMOTIVE VEHICLES.

Application filed May 5, 1920. Serial No. 378,965.

*To all whom it may concern:*

Be it known that I, FRED H. COZZENS, a citizen of the United States of America, residing at New York, in the county and State of New York, have invented certain new and useful Improvements in Transmission Mechanism for Automotive Vehicles, of which the following is a full, clear, and exact description.

This invention relates to change-speed transmission gearing for automobiles, particularly heavy tractors. In vehicles of this character, designed for high power and heavy hauling, it is especially desirable to operate at all times at an efficient speed, but the relatively low speed of travel of such tractors, say from ten to about twelve miles per hour even under the best conditions of load and road, makes the usual three speeds forward and one in reverse inadequate for the most effective utilization of the fuel. It is therefore becoming the practice to provide a higher number of transmission speeds, in some cases as many as twelve forward. The present invention is directed to this feature, and its chief object, briefly stated, is to provide a simple and convenient gearset or transmission by which an adequate number of "speeds" may be obtained, say eight forward and two in reverse.

In carrying out my invention in the preferred manner I provide, in addition to the usual driving shaft connected to the motor through a suitable clutch, and the usual driven shaft connected to the driving wheels, a countershaft on which all the sliding gears (for forward speeds) are mounted, the gears on the driving and driven shafts being immovable on the shafts, either integral therewith or fixed thereto. The driving shaft has two or more driving gears of different sizes, and the driving energy is transmitted to the countershaft from one or another of these gears to one or another of a plurality of driving gears slidable on the countershaft, while from the latter the energy is transmitted from the remaining sliding gears to the fixed gears on the driven shaft. The countershaft can thus be rotated at two or more speeds, and as a result the driven shaft can be rotated at (at least) twice as many speeds as it has driven-gears. In the embodiment illustrated in the accompanying drawings the driving shaft has two fixed driving gears, the countershaft has two sliding driven gears and four sliding driving gears, and the driven shaft has four fixed driven gears, thus providing four forward speeds for each speed of the countershaft, or eight forward speeds in all.

Referring to the drawings,

Fig. 1 is a side elevation of the gearing, the case and bearings being in vertical section, with the gears in "neutral".

Figs. 2, 3, and 4 are cross sections on lines 2—2, 3—3, and 4—4, respectively, of Fig. 1.

Fig. 5 is a top view of the transmission with the cover plate and shifting mechanism removed and with the bearings for the driving shaft shown in section.

Fig. 6 is a horizontal detail section about on line 6 of Fig. 3.

Fig. 7 is a sectional view, on line 7—7 of Fig. 2, showing a detail of the mechanism for actuating the steering mechanism of the vehicle by energy taken from the transmission gearset.

Fig. 8 is a detail side view of parts shown in Fig. 1 but showing certain gears in a different operative position.

Fig. 9 is a detail side view, from the left of Fig. 3, showing the reverse gears in engaged or operative position.

Figure 4:
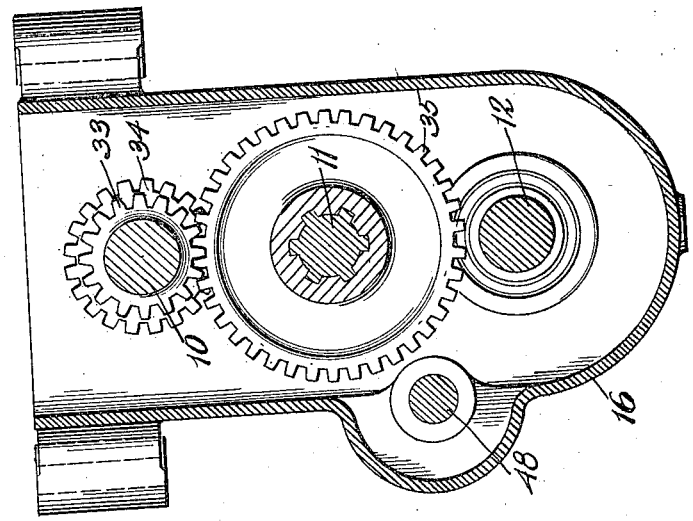

The driving shaft 10, Fig. 1, the countershaft 11, splined as indicated, and the driven shaft 12 extend longitudinally of the vehicle in the usual manner, and are mounted in suitable bearings 13, 14, 15, respectively, carried in the end walls of the transmission box 16. On top of the latter is a slip-rod casing 17, in which four slip rods are mounted, designated by 18, 19, 20, 21, Fig. 2, having the usual forks or yokes 22, 23, 24, 25 for shifting the sliding gears as hereinafter described. Each slip-rod has an impositive lock of the conventional type, composed of a spring-pressed ball 26, Fig. 1, cooperating with three notches in the slip-rod itself.

The driving shaft 10 is rotated by the motor (not shown) through a flexible joint 27, Fig. 1. The present embodiment is designed for a "four-wheel drive", and hence the driven shaft 12 is provided with two flexible joints, 28, 29, the first for connection with the front wheels and the second for connection with the rear wheels. The latter joint is conveniently incorporated in the brakedrum 30, on which is shown a brakeband 31 having a friction lining 32.

The driving shaft 10 has two fixed gears, 33, 34, integral therewith, and on the main or forward countershaft 11 are two sliding gears 35, 36, integral with the slip collar 37 which is shifted by the fork or yoke 25 and slip-rod 21 to bring gear 35 into mesh with gear 33, as in Fig. 1, or gear 36 into mesh with gear 34 as in Fig. 8. It will be understood, from the relative sizes of the gears mentioned, that in the first position, Fig. 1, the countershaft will be rotated at a lower speed than in the second position, Fig. 2, it being assumed of course that the engine speed is not varied beyond certain limits.

The sliding gears 38, 39 on the countershaft 11 are integral with the slip collar 40, and can be shifted by fork 23 and slip-rod 19 to mesh gear 38 with gear 41 or gear 39 with gear 42, gears 41 and 42 being fixed on the driven shaft 12. Since the countershaft itself has two speeds it will be seen that the "first speed" of the driven shaft (produced when gears 38 and 41 are in mesh) has a low speed, produced when gears 33 and 35 are in mesh, and a high speed, produced when gears 34 and 36 are in mesh. Similarly, the "second speed" of the shaft 12, produced when gears 39 and 42 are meshed, has a low and a high speed, accordingly as gears 33 and 35, or 34 and 36 are in mesh. In like manner, gears 43 and 44, integral with collar 45, can be shifted by fork 22 and rod 18 to bring gear 43 into mesh with gear 46, producing a low and a high third speed, or gear 44 into mesh with gear 47, producing a low and a high fourth speed. In short, eight forward speeds are provided.

Figure 3:
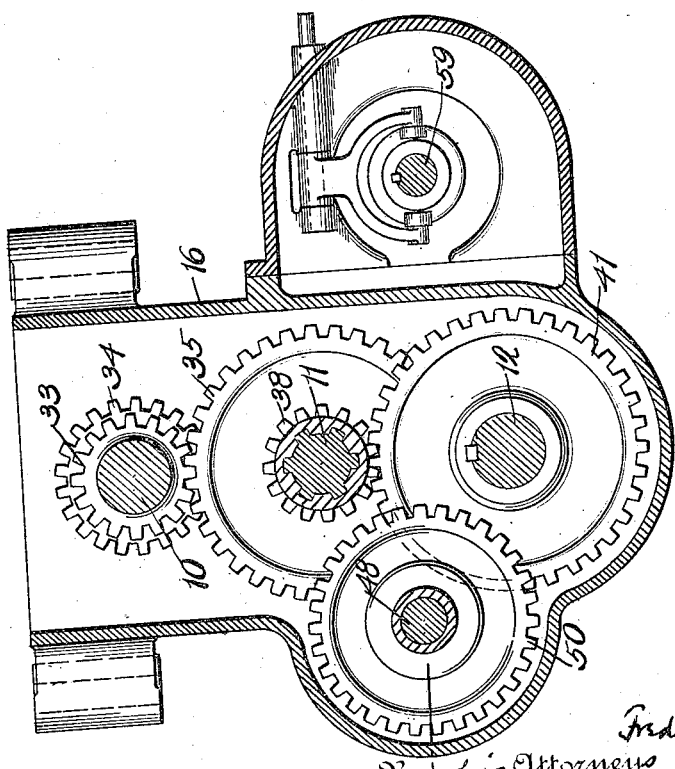

Reverse drive is effected through the medium of a reverse countershaft 48, Figs. 3, 5, 6 and 9, having sliding gears 49, 50 integral with a slip collar 51 shifted from neutral by fork 24 and slip rod 20 to bring gear 50 into mesh with gear 39 on shaft 12, as in Fig. 9, and simultaneously bring gear 49 into mesh with gear 41, thus providing two speeds in reverse by reason of the two speeds of the countershaft 11.

For the purpose of actuating the steering mechanism (not shown) a power-steer driving shaft 52 is provided (see Fig. 2) parallel to the driven shaft 12, and having a fixed gear 53 constantly in mesh with gear 47 on driven shaft 12. The shaft 52 also has a fixed miter gear 54, Fig. 7, meshing with a miter gear 55, Fig. 2, on the stub shaft 56 which has a bevel gear 57 driving a bevel gear 58 fixed on the driven shaft 59. Suffice it to say that the shaft 59 (being driven at variable speed according to the speed of the shaft 12, which has eight speeds forward and two in reverse) will actuate the steering mechanism at a variable rate depending upon the forward or rearward speed of travel of the vehicle.

It will be noted that in the mechanism illustrated the gears on the driven shaft 12 are all larger than the gears on the driving shaft 10 except gear 47, which is the same size as gear 33 and smaller than gear 34. Hence the low fourth speed is equivalent to direct drive and the high fourth is an overdrive, while at the other speeds the driven shaft rotates at less rate than the driving shaft 10.

It is to be understood that the invention is not limited to the particular construction herein specifically illustrated and described but can be embodied in other forms without departure from its spirit.

I claim:

1. In a variable speed transmission gearing for automotive vehicles, in combination, a driving shaft, a forward countershaft, variable speed gearing between the said shafts to drive the countershaft at variable speed, a driven shaft, a reverse countershaft, and relatively shiftable gearing for connecting the reverse countershaft with the forward countershaft and the driven shaft to drive the latter at constant speed relative to the speed of the forward countershaft, said variable speed gearing between the driving shaft and forward counter shafts being adapted to drive the forward counter shaft at a plurality of speeds to thereby drive the driven shaft at a plurality of reverse speeds.

2. In a variable speed transmission gearing for automotive vehicles, in combination, a driven shaft, a forward countershaft, a reverse countershaft, means for driving the driven shaft through the reverse countershaft at constant speed relative to the speed of the forward countershaft, and relatively shiftable gearing between the driving shaft and the forward countershaft to drive the latter at variable speed relatively to the speed of the driving shaft, said last mentioned gearing being adapted to effect a multiple speed reverse drive upon the driven shaft.

3. In a variable speed transmission gearing, in combination, a driven shaft having a plurality of gears fixed thereon, a forward counter-shaft having a plurality of shiftable gears to mesh selectively with only the gears on the driven shaft, a driving shaft having a plurality of gears fixed thereon, a plurality of shiftable gears on the counter-shaft to mesh selectively with only the aforesaid gears fixed on the driving shaft, a reverse counter-shaft, and gearing on the reverse counter-shaft, shiftable into and out of mesh with gears on the forward counter-shaft and the driven shaft.

In testimony whereof I hereto affix my signature.

FRED H. COZZENS.